United States Patent
Murai

(10) Patent No.: US 9,340,923 B2
(45) Date of Patent: May 17, 2016

(54) INK COMPOSITION FOR INK JET TEXTILE PRINTING AND INK JET TEXTILE PRINTING METHOD

(71) Applicant: Seiko Epson Corporation, Tokyo (JP)

(72) Inventor: Masayuki Murai, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 108 days.

(21) Appl. No.: 14/101,943

(22) Filed: Dec. 10, 2013

(65) Prior Publication Data

US 2014/0157530 A1   Jun. 12, 2014

(30) Foreign Application Priority Data

Dec. 10, 2012 (JP) .................................. 2012-269273
May 28, 2013 (JP) .................................. 2013-112264

(51) Int. Cl.

| | |
|---|---|
| C09D 11/30 | (2014.01) |
| C09D 11/32 | (2014.01) |
| C09D 11/328 | (2014.01) |
| C09D 11/36 | (2014.01) |
| D06P 1/38 | (2006.01) |
| D06P 5/30 | (2006.01) |
| C09D 5/36 | (2006.01) |
| C09D 11/38 | (2014.01) |

(52) U.S. Cl.
CPC ... *D06P 5/30* (2013.01); *C09D 5/36* (2013.01); *C09D 11/30* (2013.01); *C09D 11/328* (2013.01); *C09D 11/38* (2013.01); *D06P 1/38* (2013.01)

(58) Field of Classification Search
CPC .............. D06P 5/30; D06P 1/38; C09D 11/30; C09D 11/328; C09D 11/32; C09D 11/36
See application file for complete search history.

(56) References Cited

U.S. PATENT DOCUMENTS

| | | | |
|---|---|---|---|
| 6,814,790 B2 * | 11/2004 | Sir et al. ...................... | 106/31.27 |
| 2003/0172840 A1 * | 9/2003 | Blank et al. ................ | 106/31.27 |
| 2007/0101900 A1 | 5/2007 | Wheeler et al. | |
| 2008/0184912 A1 | 8/2008 | Lee et al. | |

FOREIGN PATENT DOCUMENTS

| | | |
|---|---|---|
| DE | 10 2008 054 404 A1 | 6/2010 |
| JP | 2011-195680 A | 10/2011 |
| WO | 99/55955 A1 | 11/1999 |

* cited by examiner

*Primary Examiner* — Amina Khan
(74) *Attorney, Agent, or Firm* — Nutter McClennen & Fish LLP; John J. Penny, Jr.; Alex Nagorniy

(57) ABSTRACT

An ink composition for ink jet textile printing contains a reactive dye and water-soluble organic solvents including solvent A and at least one solvent B. Solvent A has a solubility of 10 g or more in 100 g of water at 20° C. and has no hydroxy group. Solvent B has a hydroxy group in the molecule thereof and has an IOB value of 2.9 or more and a $Z_1$ value expressed by the following equation (1) of 18 or less. The total content $Z_2$ of solvent A and solvents B in the ink composition is 3.8% by mass or more.

$$Z_1 = \sum_{i=1}^{n} (100 * Ii * Xi) \quad (1)$$

wherein n represents the total number of solvents B in the ink composition, Ii represents the IOB value of solvent Bi that is any one of the solvents B, and Xi represents the ratio of the mass of solvent Bi to the total mass of the ink composition.

10 Claims, No Drawings

INK COMPOSITION FOR INK JET TEXTILE PRINTING AND INK JET TEXTILE PRINTING METHOD

BACKGROUND

1. Technical Field

The present invention relates to an ink composition for ink jet textile printing and to an ink jet textile printing method.

2. Related Art

Textile printing is a widely known process for applying color to fabrics. Known techniques for textile printing include screen printing, roller printing, rotary printing and transfer printing.

These techniques are, however, not suitable for producing small batches of a variety of products because these techniques require a different printing plate for each pattern of a design. In addition, it is difficult to respond quickly to recent fashion trends.

A method using an ink jet technique is an approach for overcoming these disadvantages of textile printing. In this method, ink is applied to cloth or any other material by using an ink jet technique. The ink used for the ink jet technique is required to have an appropriate surface tension and to be stably ejected. Unfortunately, this limits the dye content in the ink and results in insufficient depth of shade in the printed textile.

In order to solve this issue, for example, JP-A-2011-195680 discloses a method for dyeing cloth with an ink containing a reactive dye. However, although such an ink jet textile printing ink containing a reactive dye provides a printed textile having a high depth of shade, the resulting pattern is often not clear.

SUMMARY

An advantage of some aspects of the invention is that it provides an ink composition for ink jet textile printing that exhibits high ejection stability and can form patterns having high optical densities (OD values), and an ink jet textile printing method that can form patterns having high OD values.

According to an aspect of the invention, an ink composition for ink jet textile printing is provided. The ink composition contains a reactive dye and a water-soluble organic solvent. The water-soluble organic solvent contains at least one solvent selected from the group consisting of solvents A and solvents B. Each of solvents A has a solubility of 10 g or more in 100 g of water at 20° C. and the molecule thereof does not have a hydroxy group. Each of solvents B has an IOB value of 2.9 or more and the molecule thereof has a hydroxy group. Solvents B have a $Z_1$ value expressed by the following equation (1) of 18 or less, and the total content $Z_2$ of solvents A and solvents B in the ink composition is 3.8% by mass or more.

$$Z_1 = \sum_{i=1}^{n}(100 * Ii * Xi) \quad (1)$$

where, n represents the total number of solvents B in the ink composition, Ii represents the IOB value of solvent Bi that is any one of the solvents B, and Xi represents the ratio of the mass of solvent Bi to the total mass of the ink composition.

The ink composition can be stably ejected to form a pattern having a high optical density (OD value).

Preferably, the $Z_1$ value is 10 or less. Such an ink composition can prevent unsatisfactory dyeing effectively.

Preferably, the total content $Z_2$ is 10% by mass or more. Such an ink composition can be more stably ejected.

In the ink composition, preferably, the water-soluble organic solvent may further contain solvent C which has an IOB value of lower than 2.9 and whose molecule has a hydroxy group. The solvent C content in the ink composition may be in the range of 1.5% to 3.0% by mass. Thus, the depth of shade can be increased in the resulting printed textile.

Preferably, solvent C is an alkanediol or alkanetriol having an IOB value in the range of 1.6 to 2.5. Such an ink composition can prevent unsatisfactory dyeing more effectively while maintaining high ejection stability.

Preferably, the reactive dye contains C.I. Reactive Black 39 and at least one of C.I. Reactive Orange 99 and C.I. Reactive Brown 11. Such an ink composition can form a pattern having a higher depth of shade.

Preferably, the proportion of the C.I. Reactive Black 39 content is in the range of 3 to 3.5 to the total content of C.I. Reactive Orange 99 and C.I. Reactive Brown 11. Such an ink composition can form a pattern having a still higher depth of shade.

According to another aspect of the invention, an ink jet textile printing method using the above-described ink composition is provided. This method can form a pattern having a high OD value.

DESCRIPTION OF EXEMPLARY EMBODIMENTS

Preferred embodiments of the invention will now be described in detail.

Ink Composition for Ink Jet Textile Printing

An ink composition for ink jet textile printing will now be described. The ink composition contains a reactive dye and a water-soluble organic solvent.

Inks used for the ink jet technique are required to have an appropriate surface tension and to be stably ejected. Accordingly, there is a limit on the dye content of known ink jet textile printing inks, and this results in insufficient depth of shade in the printed textile.

In order to solve this issue, there has been provided a method for dyeing cloth with an ink containing a reactive dye. However, although such an ink jet textile printing ink containing a reactive dye provides a printed textile having a high depth of shade, the resulting pattern is often not clear. The reason may be as described below.

In textile printing using a reactive dye, in general, the reactive group of the reactive dye is caused to react with the hydroxy group (OH group) of cloth or any other material by heating with steam or the like, thereby applying color to the cloth or the like.

Known ink jet textile printing inks contain a large amount of a solvent having an OH group so as to be able to be stably stored and stably ejected. Therefore the OH group of the solvent reacts with the reactive group of the reactive dye and thus reduces the amount of the reactive group that will react with the OH group of the cloth or the like. Consequently, the pattern cannot exhibit high depth of shade (optical density) and is often not clear.

The present inventors found that use of a water-soluble organic solvent can be a solution to this disadvantage. The water-soluble organic solvent contains at least one of solvents A each of which has a solubility of 10 g or more in 100 g of water at 20° C. and whose molecule does not have a hydroxy group, and solvents B each of which has an IOB value of 2.9 or more and whose molecule has a hydroxy group. The water-soluble organic solvent satisfies the following requirements 1 and 2:

Requirement 1: the $Z_1$ value expressed by the following equation (1) is 18 or less.

$$Z_1 = \sum_{i=1}^{n} (100 * Ii * Xi) \tag{1}$$

where n represents the total number of solvents B in the ink composition, Ii represents the IOB value of solvent Bi that is any one of the solvents B, and Xi represents the ratio of the mass of solvent Bi to the total mass of the ink composition.

Requirement 2: The total content $Z_2$ of solvents A and solvents B in the ink composition is 3.8% by mass or more.

By satisfying requirements 1 and 2, unsatisfactory dyeing resulting from the reaction of the reactive group of the reactive dye with the OH group of the solvent can be prevented while the ejection stability of the ink composition is maintained. Thus, an ink composition that can be ejected stably and can form patterns having high OD values can be provided for ink jet textile printing.

The term IOB value refers to a value that is the result when the inorganic value (IV) of a substance is divided by the organic value (OV) of the substance according to an organic conceptual diagram. The organic conceptual diagram is a mapping of an organic compound prepared by plotting the organicity (covalency) based on the number of carbon atoms of the organic compound and the inorganicity (ion binding property) based on the substituent of the organic compound using rectangular coordinates defined by an organic axis and an inorganic axis, and is one of the indexes for estimating the properties of the organic compound. More specifically, one carbon atom corresponds to an organic value of 20. The total inorganic value (IV) and total organic value (OV) of an organic compound are calculated from the structure of the organic compound, using the organic value and inorganic value of each of the substituents of the organic compound (for more information, see, for example, New Technology and Application of Dispersion & Emulsion Systems (in Japanese), Techno System Inc., p. 166).

IOB Value Calculation

An example of IOB value calculation will now be described. The molecule of triethylene glycol monobutyl ether has ten carbon atoms, an OH group and three ether linkages. In a primary alcohol having a plurality of ethylene glycol chains, the ether linkage adjacent to the alkyl group has an inorganicity of 20, and the other ether linkages each have an inorganicity of 75. Hence, for triethylene glycol monobutyl ether, the organic value is 20×10=200; the inorganic value is 100+20+150=270; and the IOB value is 270/200=1.35. Triethylene glycol has six carbon atoms, two OH groups and two ether linkages. According to the same calculation as triethylene glycol monobutyl ether, triethylene glycol has an organic value of 20×6=120, an inorganic value of 100×2+75×2=350, and an IOB value of 350/120=2.92.

The constituents of the ink jet textile printing ink composition will now be described in detail.

Reactive Dye

The ink composition contains a reactive dye. In general, a reactive dye refers to a compound having a reactive group that can form a covalent bond with a hydroxy group or an amino group.

Exemplary reactive groups include monochlorotriazine, monofluorotriazine, carboxypyridiniotriazine, dichlorotriazine, vinyl sulfone, sulfatoethylsulfone, fluorochloropyrimidine, trichloropyrimidine, and bromoacrylamid. The reactive dye used in the present embodiment has at least one of these known reactive groups and other reactive groups. In particular, a reactive dye containing a triazine derivative as a reactive group is highly reactive with cotton fiber and superior in color developability, and is accordingly advantageous.

Any reactive dye may be used as long as it has one or more reactive groups. For example, the reactive dye may be a dye having two or more monochlorotriazine groups, or a dye having different reactive groups in the molecule, such as a dye having a monochlorotriazine or monofluorotriazine group and a sulfatoethylsulfone group in the molecule.

Examples of the reactive dye include C.I. Reactive Yellows 2, 3, 7, 15, 17, 18, 22, 23, 24, 25, 27, 37, 39, 42, 57, 69, 76, 81, 84, 85, 86, 87, 92, 95, 102, 105, 111, 125, 135, 136, 137, 142, 143, 145, 151, 160, 161, 165, 167, 168, 175 and 176, C.I. Reactive Oranges 1, 4, 5, 7, 11, 12, 13, 15, 16, 20, 30, 35, 56, 64, 67, 69, 70, 72, 74, 82, 84, 86, 87, 91, 92, 93, 95, 99 and 107, C.I. Reactive Reds 3:1, 2, 3, 5, 8, 11, 21, 22, 23, 24, 28, 29, 31, 33, 35, 43, 45, 49, 55, 56, 58, 65, 66, 78, 83, 106, 111, 112, 113, 114, 116, 120, 123, 124, 128, 130, 136, 141, 147, 158, 159, 171, 174, 180, 183, 184, 187, 190, 193, 194, 195, 198, 218, 220, 222, 223, 226, 228 and 235, C.I. Reactive Violets 1, 2, 4, 5, 6, 22, 23, 33, 36 and 38, C.I. Reactive Blues 2, 3, 4, 7, 13, 14, 15, 19, 21, 25, 27, 28, 29, 38, 39, 41, 49, 50, 52, 63, 69, 71, 72, 77, 79, 89, 104, 109, 112, 113, 114, 116, 119, 120, 122, 137, 140, 143, 147, 160, 161, 162, 163, 168, 171, 176, 182, 184, 191, 194, 195, 198, 203, 204, 207, 209, 211, 214, 220, 221, 222, 231, 235 and 236, C.I. Reactive Greens 8, 12, 15, 19 and 21, C.I. Reactive Browns 2, 7, 9, 10, 11, 17, 18, 19, 21, 23, 31, 37, 43 and 46, and C.I. Reactive Blacks 5, 8, 13, 14, 31, 34 and 39.

If the ink jet textile printing ink composition is used as a black ink, it is preferable that the ink composition contain C.I. Reactive Black 39 and at least either C.I. Reactive Orange 99 or C.I. Reactive Brown 11. Such an ink composition can form a pattern having a higher depth of shade. Consequently, the resulting pattern has a higher optical density.

In the ink composition, preferably, the proportion of the C.I. Reactive Black 39 content is in the range of 3 to 3.5 to the total content of C.I. Reactive Orange 99 and C.I. Reactive Brown 11. Such an ink composition can form a pattern having a still higher depth of shade. Consequently, the resulting pattern has a higher optical density.

The total content of reactive dyes in the ink composition is preferably, but is not limited to, 5% to 30% by mass, and more preferably 12% to 24% by mass. Such an ink composition can be stably ejected, and can form a pattern having a still higher optical density.

Water-Soluble Organic Solvent

The ink composition contains a water-soluble organic solvent. The water-soluble organic solvent contains at least one solvent selected from the group consisting of solvents A each of which has a solubility of 10 g or more in 100 g of water at 20° C. and whose molecule does not have a hydroxy group, and solvents B each of which has an IOB value of 2.9 or more and whose molecule has a hydroxy group.

Exemplary solvents A include urea compounds, such as urea, thiourea, ethyleneurea, and 1,3-dimethylimidazolidinone; lactams, such as 2-pyrrolidone, N-methyl-2-pyrrolidone, and ε-caprolactam; lactones, such as α-acetolactone, β-propiolactone, γ-butyrolactone, and δ-valerolactone; amides, such as 3-methoxy-N,N-dimethylpropaneamide and 3-butoxy-N,N-dimethylpropaneamide; and trimethylglycine.

Solvents A contribute to increasing the depth of shade. Consequently, the resulting pattern has still higher optical density. The solvent A content in the ink composition is preferably in the range of 5% to 20% by mass, more preferably 7% to 15% by mass.

Exemplary solvents B include glycols, such as glycerol (IOB=5.00), ethylene glycol (IOB=5.00), diethylene glycol (IOB=3.4), triethylene glycol (IOB=2.92), tetraethylene glycol (IOB=2.66), polyethylene glycol, and propylene glycol (IOB=3.33); and 1,3-propanediol (IOB=3.3). Solvents B contribute to increasing the ejection stability of the ink composition.

The solvent B content in the ink composition is preferably in the range of 1% to 10% by mass, more preferably 2% to 7% by mass. Thus, the ejection stability of the ink composition can be efficiently increased, and the resulting printed textile can exhibit high depth of shade. In the present embodiment, the solvents B have a $Z_1$ value expressed by equation (1) of 18 or less, preferably 10 or less. Such an ink composition can prevent unsatisfactory dyeing effectively.

Also, the total content $Z_2$ of solvents A and solvents B is 3.8% by mass or more, preferably 10% by mass or more. Such an ink composition can be more stably ejected.

The ink composition may further contain solvent C as another water-soluble organic solvent. Solvent C has an IOB value of less than 2.9 and the molecule thereof has a hydroxy group. Solvent C contributes to further increasing the depth of shade. The solvent C content in the ink composition is preferably in the range of 1.5% to 3.0% by mass. Thus, the depth of shade can be increased in the resulting printed textile.

Examples of solvent C include alkanediols, such as 1,4-butanediol (IOB=2.50), 1,5-pentanediol (IOB=2.00), and 1,6-hexanediol (IOB=1.67); glycols, such as dipropylene glycol (IOB=2.29) and polypropylene glycol; alkanetriols, such as 1,2,6-hexanetriol (IOB=2.50) and trimethylolpropane (IOB=2.50); and glycol ethers, such as ethylene glycol mono-n-butyl ether (IOB=1.00), diethylene glycol n-butyl ether (IOB=1.22), triethylene glycol n-butyl ether (IOB=1.35), ethylene glycol mono-n-methyl ether (IOB=2.00), diethylene glycol mono-n-methyl ether (IOB=1.95), and triethylene glycol mono-n-methyl ether (IOB=1.93).

Preferably, solvent C has an IOB value in the range of 1.0 to 2.5. For example, glycol ether, alkanediol and alkanetriol, which have IOB values in the range of 1.0 to 2.5, are advantageously used. Such an ink composition can prevent unsatisfactory dyeing more effectively while maintaining high ejection stability.

Water

The ink composition may further contain water. The water acts as a dispersion medium in which the reactive dye disperses. Water in the ink composition adjusts the viscosity and surface tension of the ink composition to appropriate levels so the ink composition can be further stably ejected by an ink jet technique. Also, since water can be easily removed after being ejected by an ink jet technique, the productivity of manufacture of dyed articles can be increased. In addition, water is very safe to the human body. This is very important in ensuring workers' safety. The water content in the ink composition is preferably, but is not limited to, 50% to 90% by mass, and more preferably 55% to 80% by mass.

Other Constituents

The ink composition may further contain other constituents. For example, the ink composition may contain a dispersant, a preservative or antifungal, a pH adjuster, a chelating reagent, a rust preventive, an ultraviolet absorbent, an antifoaming agent, a surface tension adjuster and other additives.

The ink composition of the present embodiment may be prepared, for example, by dispersing the constituents in each other in a dispersing/mixing machine such as a ball mill, a sand mill, an attritor, a basket mill, or a roll mill. Preferably, the resulting mixture, which is the undiluted stock ink composition, is filtered through a filter, such as a membrane filter or a mesh filter, to remove coarse particles.

Ink Jet Textile Printing Method

An ink jet textile printing method will now be described. In the ink jet textile printing method of an embodiment of the invention, cloth or any other material is dyed with an ink composition according to an embodiment of the invention. Since the above-described ink jet textile printing ink composition is used in the method, the resulting printed textile or dyed article exhibits a high OD value.

In the ink jet textile printing method, an ink jet printer including an ink cartridge charged with the ink composition ejects the ink composition onto a material to be dyed. The ink jet printer may be, but not limited to, of a drop-on-demand type. The drop-on-demand ink jet printer may adopt a piezoelectric recording technique using piezoelectric elements disposed in a recording head, a thermal jet recording technique using heaters of heat resistors disposed in a recording head, or other techniques, and any recording technique may be used.

When the ink jet textile printing is applied to cloth, it is preferable that the cloth be pretreated with a pretreatment agent. For the pretreatment, the cloth may be immersed in the pretreatment agent, or the pretreatment agent is applied or sprayed to the cloth, followed by drying the cloth. The pretreatment agent may be an aqueous solution containing 0.01% to 20% by mass of a sizing agent of a water-soluble polymer or the like, and 1% to 5% by mass of an alkali generator.

Examples of the sizing agent include starches of corn, wheat or the like, cellulose such as carboxymethyl cellulose and hydroxymethyl cellulose, polysaccharides such as sodium alginate, gum arabic, locust bean gum, trant gum, guar gum and tamarind seeds, protein such as gelatin and casein, water-soluble natural polymers such as tannin and lignin, and water-soluble synthetic polymers such as polyvinyl alcohol compounds, polyethylene oxide compounds, acrylic compounds and maleic anhydride compounds. The alkali generator may be sodium hydrogencarbonate or sodium carbonate. The pretreatment agent may further contain a moisturizing agent, such as urea or thiourea, a pH adjuster, an antireductant, a penetrant, a metal ion-blocking agent, an antifoaming agent, and other additives, if necessary.

For the ink jet textile printing method, the ink jet textile printing ink composition is ejected to a material such as cloth to print characters and/or a pattern, and then the dye in the ink composition is fixed to the cloth or the like. For fixing the dye, a technique used in known textile printing methods may be applied, such as a technique using normal pressure steam or high pressure steam, or a thermally fixing technique. After the dye has been fixed, the cloth is washed with water and dried in the usual manner. Soaping treatment (washing out the unfixed dye with a heat soap solution) may be performed, if necessary.

While the invention has been described with reference to exemplary embodiments, it is to be understood that the invention is not limited to the disclosed embodiments.

EXAMPLES

[1] Preparation of Ink Jet Textile Printing Ink Composition

Ink compositions for ink jet textile printing were prepared as below.

Example 1

For an ink composition of Example 1, the constituents shown in the Table were mixed in proportions (mass basis) according to the Table, and the mixture was filtered through a filter of 0.5 μm in pore size.

Examples 2 to 21, Comparative Examples 1 to 4

Each ink composition was prepared in the same manner as in Example 1, except that the constituents shown in the Table were used with the content shown in the Table.

TABLE

| | | IOB value | Example 1 | 2 | 3 | 4 | 5 | 6 | 7 | 8 | 9 | 10 | 11 | 12 | 13 |
|---|---|---|---|---|---|---|---|---|---|---|---|---|---|---|---|
| Dye | Reactive Black 39 | — | 13.2 | 13.2 | 12.8 | 13.2 | 13.2 | 12.8 | 13.2 | 13.2 | 12.8 | 13.2 | 13.2 | 13.2 | 13.9 |
| | Reactive Orange 99 | — | 4.5 | 4.5 | 4.6 | 4.5 | 4.5 | 4.6 | 4.5 | 4.5 | 4.6 | 4.5 | 4.5 | 4.5 | — |
| | Reactive Brown 11 | — | — | — | — | — | — | — | — | — | — | — | — | — | 4 |
| Solvent A | Urea | — | — | — | — | 6 | 7.5 | — | 5.7 | 5.7 | 5.7 | — | 8 | 6 | — |
| | Trimethylglycine | — | — | — | — | 2 | — | 9 | 2.1 | 2.1 | 2.1 | — | 5 | 2 | — |
| | 2-Pyrrolidone | — | — | — | — | — | — | — | — | — | — | — | — | — | — |
| | Ethyleneurea | — | — | — | — | — | — | — | — | — | — | — | — | — | — |
| | γ-Butyrolactone | — | — | — | — | — | — | — | — | — | — | — | — | — | — |
| | 3-Methoxy-N,N-dimethylpropaneamide | — | — | — | — | — | — | — | — | — | — | — | — | — | — |
| | 3-Butoxy-N,N-dimethylpropaneamide | — | — | — | — | — | — | — | — | — | — | — | — | — | — |
| Solvent B | Triethylene glycol | 2.92 | 5.8 | — | — | — | — | — | 5.8 | — | — | 3 | — | 5.8 | 5.8 |
| | Glycerol | 5.00 | — | 3.7 | — | — | — | — | — | 3.7 | — | — | — | — | — |
| | Polyethylene glycol | 3.33 | — | — | 5.5 | — | — | — | — | — | 5.5 | — | — | — | — |
| Solvent C | 1,6-Hexanediol | 1.67 | — | — | — | — | — | — | — | — | — | — | — | — | — |
| | 1,2,6-Hexanetriol | 2.50 | — | — | — | — | — | — | — | — | — | — | — | — | — |
| | Triethylene glycol monobutyl ether | 1.35 | — | — | — | — | — | — | — | — | — | — | — | — | — |
| | Triisopropanol amine | — | 0.5 | 0.4 | 0.6 | 0.5 | 0.5 | 0.5 | 0.5 | 0.5 | 0.5 | 0.5 | 0.5 | 0.5 | 0.5 |
| | Water | — | 76 | 78.2 | 76.5 | 73.8 | 74.3 | 73.1 | 68.2 | 70.3 | 68.8 | 78.8 | 68.8 | 68 | 75.8 |
| | $Z_1$ | | 16.9 | 18.5 | 18.3 | 0.0 | 0.0 | 0.0 | 16.9 | 18.5 | 18.3 | 8.8 | 0.0 | 16.9 | 16.9 |
| | $Z_2$ | | 5.8 | 3.7 | 5.5 | 8.0 | 7.5 | 9.0 | 13.6 | 11.5 | 13.3 | 3.0 | 13.0 | 13.8 | 5.8 |
| | Depth of shade | | B | B | B | A | A | A | B | B | B | A | A | B | B |
| | Ejection stability | | B | B | B | B | B | B | A | A | A | B | A | A | B |

| | | IOB value | Example 14 | 15 | 16 | 17 | 18 | 19 | 20 | 21 | Comparative Example 1 | 2 | 3 | 4 |
|---|---|---|---|---|---|---|---|---|---|---|---|---|---|---|
| Dye | Reactive Black 39 | — | 13.2 | 13.2 | 13.2 | 13.2 | 13.2 | 12.8 | 13.2 | 13.2 | 13.2 | 12.8 | 13.2 | 13.2 |
| | Reactive Orange 99 | — | 4.5 | 4.5 | 4.5 | 4.5 | 4.5 | 4.6 | 4.5 | 4.5 | 4.5 | 4.6 | 4.5 | 4.5 |
| | Reactive Brown 11 | — | — | — | — | — | — | — | — | — | — | — | — | — |
| Solvent A | Urea | — | — | — | — | — | — | — | — | — | 6 | 5.7 | 5.7 | 5.7 |
| | Trimethylglycine | — | — | — | — | — | — | — | — | — | 2 | 2.1 | 2.1 | 2.1 |
| | 2-Pyrrolidone | — | — | — | — | 9 | — | — | — | — | — | — | — | — |
| | Ethyleneurea | — | — | — | — | — | 7 | — | — | — | — | — | — | — |
| | γ-Butyrolactone | — | — | — | — | — | — | 9 | — | — | — | — | — | — |
| | 3-Methoxy-N,N-dimethylpropaneamide | — | — | — | — | — | — | — | 8 | — | — | — | — | — |
| | 3-Butoxy-N,N-dimethylpropaneamide | — | — | — | — | — | — | — | — | 8 | — | — | — | — |
| Solvent B | Triethylene glycol | 2.92 | 5.8 | 5.8 | 5.8 | — | — | — | — | — | 6.5 | — | — | 10 |
| | Glycerol | 5.00 | — | — | — | — | — | — | — | — | — | 4.9 | — | — |
| | Polyethylene glycol | 3.33 | — | — | — | — | — | — | — | — | — | — | 7.5 | — |
| Solvent C | 1,6-Hexanediol | 1.67 | 1.9 | — | — | — | — | — | — | — | — | — | — | — |
| | 1,2,6-Hexanetriol | 2.50 | — | 1.5 | — | — | — | — | — | — | — | — | — | — |
| | Triethylene glycol monobutyl ether | 1.35 | — | — | 1.5 | — | — | — | — | — | — | — | — | — |
| | Triisopropanol amine | — | 0.5 | 0.5 | 0.5 | 0.5 | 0.5 | 0.5 | 0.5 | 0.5 | 0.5 | 0.5 | 0.5 | 0.5 |
| | Water | — | 74.1 | 74.5 | 74.5 | 72.8 | 74.8 | 73.1 | 73.8 | 73.8 | 67.3 | 69.4 | 66.5 | 64 |
| | $Z_1$ | | 16.9 | 16.9 | 16.9 | 0.0 | 0.0 | 0.0 | 0.0 | 0.0 | 19.0 | 24.5 | 25.0 | 29.2 |
| | $Z_2$ | | 5.8 | 5.8 | 5.8 | 9.0 | 7.0 | 9.0 | 8.0 | 8.0 | 14.5 | 12.7 | 15.3 | 17.8 |
| | Depth of shade | | A | A | B | A | A | A | A | A | C | C | C | D |
| | Ejection stability | | B | B | A | B | B | B | B | B | B | B | B | A |

[2] Evaluation of Ejection Stability

An ink cartridge of an ink jet recording apparatus PX-G930 (manufactured by Seiko Epson) was charged with any one of the ink compositions of the Examples and Comparative Examples, and printing was continuously performed on 1000 sheets of A4 super fine paper manufactured by Seiko Epson at a printing rate of 90 sheets per hour in an atmosphere of 25° C. in temperature and 60% in humidity. Then, the surfaces of the resulting printed sheets were observed for ejection failure (dot missing), and the ejection stability of the ink composition was evaluated according to the following criteria:
A: Dot missing was less than 1%.
B: Dot missing was 1% or more and less than 20%.
C: Dot missing was 20% or more.
The results are shown in the Table.

[3] Production of Dyed Article

The following pretreatment agent was applied to cotton cloth and the cloth was dried by squeezing the cloth at a pick-up rate of 20% with a mangle. Textile printing was performed on the pretreated cotton cloth, using each of the ink compositions of the Examples and Comparative Examples and a printer PX-G930 (manufactured by Seiko Epson). After fixing the ink composition to the printed cloth by steaming at 103° C. for 10 minutes, the printed cloth was washed with 0.2% aqueous solution of Laccol STA (produced by Meisei Chemical Works) at 55° C. for 10 minutes, followed by drying. Thus, a dyed article was prepared.
Pretreatment Agent
The Pretreatment Agent Contained:
Sodium alginate: 1.0% by weight;
Guar gum: 1.0% by weight;
Ammonium sulfate: 4.0% by weight;
Urea: 10.0% by weight; and
Ultrapure water: balance.

[4] Evaluation of Depth of shade (Optical Density)

The dyed article prepared in the above [3] was measured for the optical density (OD value) of the dyed portion, using SpectroScan (manufactured by GretagMacbeth). The results were evaluated according to the following criteria:
A: The surface of the dyed portion had an OD value of 1.60 or more.
B: The surface of the dyed portion had an OD value of 1.40 or more and less than 1.60.
C: The surface of the dyed portion had an OD value of 1.20 or more and less than 1.40.
D: The surface of the dyed portion had an OD value of less than 1.20.

The results are shown in the Table. The Table clearly shows that the ink compositions of the Examples exhibited superior ejection stability. Also, the patterns formed with the ink compositions of the Examples had high OD values. In contrast, the ink compositions of the Comparative Examples did not provide good results.

The entire disclosure of Japanese Patent Application No. 2012-269273, filed Dec. 10, 2012 and No. 2013-112264, filed May 28, 2013 are expressly incorporated by reference herein.

What is claimed is:

1. An ink composition for ink jet textile printing, comprising:
12-24% of a reactive dye mixture, wherein the reactive dye mixture comprises C.I. Reactive Black 39 and one of C.I. Reactive Orange 99 and C.I. Reactive Brown 11, and the proportion of the C.I. Reactive Black 39 content to the total content of C.I. Reactive Orange 99 or C.I. Reactive Brown 11 is 2.7 or in the range of 3.0 to 3.5; and
a water-soluble organic solvent comprising at least one solvent selected from the group consisting
of 5-15% of solvent A, wherein solvent A is selected from the group consisting of urea, trimethylglycine, 2-pyrrolidone, ethyleneurea, γ-butyrolactone, 3-methoxy-N,N-dimethylpropaneamide, and 3-butoxy-N,N-dimethylpropaneamide, each of which has a solubility of 10 g in 100 g water at 20° C. and whose molecule has no hydroxy group, and 3-8% solvent B, wherein solvent B is selected from the group consisting of triethylene glycol, glycerol, and polyethylene glycol, each of which has an IOB value of 2.9 or more and a Z1 value of 18 or less and whose molecule has a hydroxy group,
wherein the Z1 value is expressed by the following equation:

$$Z_1 = \sum_{i=1}^{n} (100 * Ii * Xi) \tag{1}$$

wherein n represents the total number of solvent B in the ink composition, Ii represents the IOB value of solvent Bi that is any one of the solvent B, and Xi represents the ratio of the mass of solvent Bi to the total mass of the ink composition.

2. The ink composition according to claim 1, wherein the Z1 value is 10 or less.

3. The ink composition according to claim 1, wherein a total content Z2 of solvent A and solvent B is 10% to 23% by mass.

4. The ink composition according to claim 1, wherein the water-soluble organic solvent further contains solvent C, wherein solvent C is selected from the group consisting of 1,6-hexanediol, 1,2,6 hexanetriol, triethylene glycol, and monobutyl ether, which has an IOB value of less than 2.9 and whose molecule has a hydroxy group, and the solvent C content in the ink composition is in the range of 1.5% to 3.0% by mass.

5. The ink composition according to claim 4, wherein solvent C has an IOB value in the range of 1.6 to 2.5.

6. An ink jet textile printing method, comprising using the ink composition as set forth in claim 1.

7. An ink jet textile printing method, comprising using the ink composition as set forth in claim 2.

8. An ink jet textile printing method, comprising using the ink composition as set forth in claim 3.

9. An ink jet textile printing method, comprising using the ink composition as set forth in claim 4.

10. An ink jet textile printing method, comprising using the ink composition as set forth in claim 5.

* * * * *